United States Patent
Schilles et al.

(10) Patent No.: US 9,308,689 B2
(45) Date of Patent: Apr. 12, 2016

(54) METHOD FOR APPLYING AND FASTENING A DÉCOR LAYER

(75) Inventors: Wilfried Schilles, Kandel (DE); Hildegard Leidig, Kirchen/Sieg (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 875 days.

(21) Appl. No.: 13/518,759

(22) PCT Filed: Dec. 23, 2010

(86) PCT No.: PCT/EP2010/007922
§ 371 (c)(1),
(2), (4) Date: Jun. 22, 2012

(87) PCT Pub. No.: WO2011/076426
PCT Pub. Date: Jun. 30, 2011

(65) Prior Publication Data
US 2012/0263907 A1    Oct. 18, 2012

(30) Foreign Application Priority Data
Dec. 23, 2009  (DE) .......................... 10 2009 060 206

(51) Int. Cl.
*B32B 37/00* (2006.01)
*B29C 67/00* (2006.01)
(Continued)

(52) U.S. Cl.
CPC ............ *B29C 67/0048* (2013.01); *B29C 63/02* (2013.01); *B60R 13/02* (2013.01);
(Continued)

(58) Field of Classification Search
CPC ................ B29C 67/0048; B29C 63/02; B29C 2063/022; B29C 37/0025; B29C 37/0042; B29C 63/04; B29C 45/1407; B60R 13/02; B60R 2013/0281; B60R 2013/0293; B60R 13/0212–13/0268; Y10T 156/1028; Y10T 428/19; Y10T 29/49908; B29L 2031/3005
See application file for complete search history.

(56) References Cited

U.S. PATENT DOCUMENTS

| 6,524,510 B2 | 2/2003 | Spengler |
| 7,406,766 B2 * | 8/2008 | Levesque et al. ............ 29/897.2 |

FOREIGN PATENT DOCUMENTS

| DE | 102007008557 | 8/2008 |
| DE | 102008021559 | 11/2009 |
| EP | 1211051 | 6/2002 |

OTHER PUBLICATIONS
International Search Report for PCT/EP2010/007922, Apr. 19, 2011, 2 pages (translated).

*Primary Examiner* — David Bryant
*Assistant Examiner* — Jun Yoo
(74) *Attorney, Agent, or Firm* — Reising Ethington P.C.

(57) ABSTRACT

The invention relates to a method for applying and fastening a decorative layer on a preform for the formation of a support part, with the steps:
 inserting a first section (22) of the preform (20) together with the decorative layer (30) into a first tool (W1),
 moving the first tool (W1) together, wherein an end section (32) of the decorative layer (30) covers at least a portion of the first region (42) of a connecting section (40), having a groove,
 placing a second section (24) of the preform (20) onto a second tool (W2),
 moving the first (W1) and the second tool (W2) relative to one another in the groove depth direction (NT), whereby the second region (44) of the connecting section (40) is deformed such that the latter forms a groove (46) with an increasing groove depth and wherein the relative movement of the tools (W1, W2) with respect to one another takes place such that the end section (32) of the decorative layer (30) is introduced in the groove depth direction (NT) into the groove (46), and
 pressing together the groove side walls (48) for fixing the end section (32) of the decorative layer (32) in the groove (46).

14 Claims, 6 Drawing Sheets

(51) Int. Cl.
*B29C 63/02* (2006.01)
*B60R 13/02* (2006.01)
*B29C 45/14* (2006.01)
*B29C 53/36* (2006.01)
*B29L 31/30* (2006.01)

(52) U.S. Cl.
CPC ........... *B29C45/14508* (2013.01); *B29C 53/36* (2013.01); *B29C 2063/022* (2013.01); *B29L 2031/3005* (2013.01); *B60R 2013/0281* (2013.01); *B60R 2013/0293* (2013.01); *Y10T 156/1028* (2015.01); *Y10T 428/19* (2015.01)

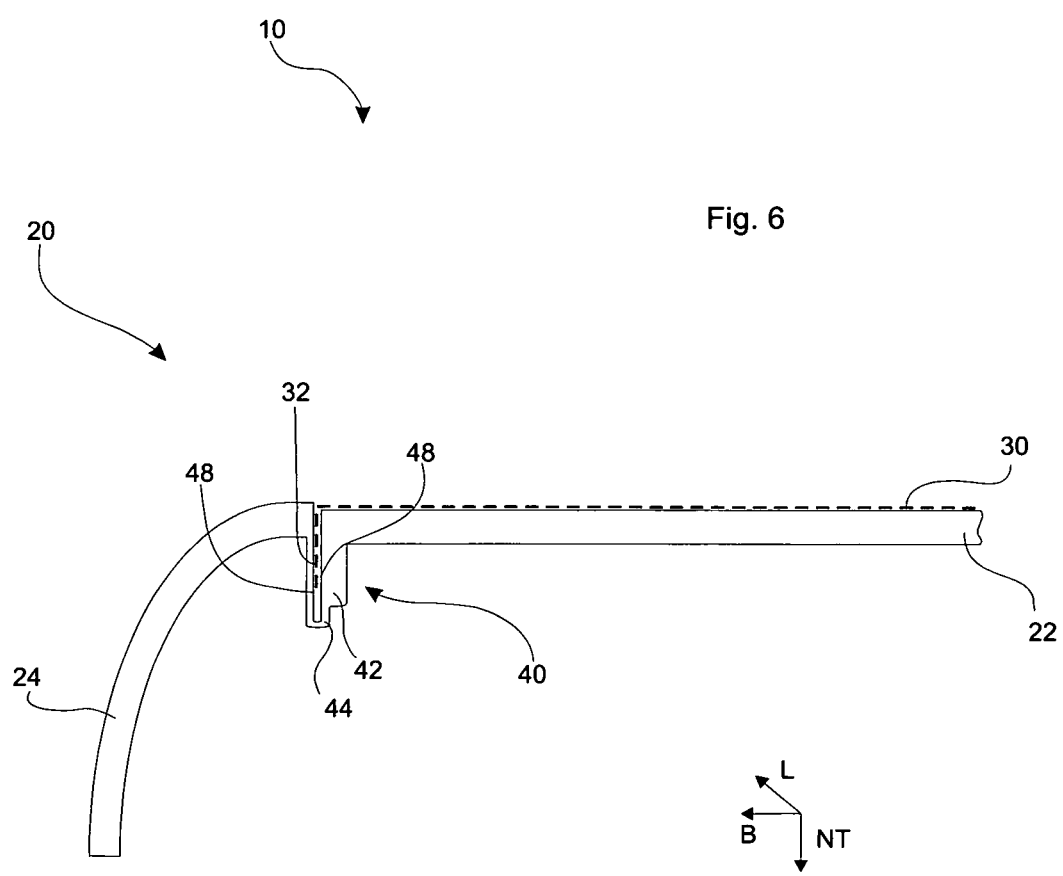

METHOD FOR APPLYING AND FASTENING A DÉCOR LAYER

TECHNICAL FIELD

The invention relates to a method for applying and fastening a decorative layer on a preform for the formation of a support part.

BACKGROUND

Such methods are known in order to apply decorative layers, such as for example leather or leather imitations, on performs of plastic, wherein the resulting support part constitutes a lining or a part of a lining of an interior of a motor vehicle. For such linings, usually various decorative layers or respectively regions with a decorative layer and regions without a decorative layer are used together on a lining. A problem in the known methods is that the transitions between regions of different decorative layers or respectively between a region with a decorative layer and a region without a decorative layer tend to adverse optical effects. Thus, for example, when gluing the decorative layer on the preform, the risk exists that parts of the adhesive emerge out from the edge of the decorative layer and harden on this edge. Adhesive projections therefore occur, which have to be removed, which means additional effort.

Moreover, the transitions between individual decorative layers or respectively the transition from decorative layer to a region without decorative layer is problematic because a gap or even a step exists there. Such a gap or step can cause the driver of the motor vehicle to consistently play with his fingers in this region over a lengthy period of time, and to thus detach the decorative layer form the preform. Such gaps or steps also harbour the risk that dirt, dust or residues from the production process such as glue become deposited therein and produce an unattractive visual appearance.

SUMMARY

It is an object of the present invention to solve the disadvantages of the known methods which are described above.

The above problem is solved by a method according to the independent claim 1 and a device according to claim 11. The invention further relates to a product according to claim 12 and a preform according to claim 13.

A method according to the invention for applying and fastening a decorative layer on a preform for the formation of a support part uses a preform which comprises a first section which is to be laminated with the decorative layer, and a second section adjoining thereto in the contour path of the preform. The first section runs along a groove depth direction of a groove formed by a connecting section, and a first region of the connecting section adjoins the first section of the preform. A second region of the connecting section is situated between the first region of the connecting section and the second section of the preform and is deformable under predetermined process conditions.

In particular the preform comprises: wherein the preform comprises: a first section which is to be laminated with the decorative layer, a second section and a connecting section connecting these sections, which has a groove extending in a longitudinal direction and pronounced in a groove depth direction and is formed from a first region extending along the groove longitudinal direction and the first section and of a second region, forming the groove, adjoining thereto and extending along the groove longitudinal direction and the second section of the preform, wherein the second region of the connecting section is formed from a material which is deformable under predetermined process conditions.

The method according to the invention comprises in particular the following steps here:
  inserting the first section of the preform together with the decorative layer into a first tool,
  moving the first tool together, wherein an end section of the decorative layer covers at least a portion of the first region of the connecting section,
  placing the second section of the preform onto a second tool,
  moving the first and the second tool relative to one another in the groove depth direction, whereby the second region of the connecting section is deformed such that the latter forms a groove with an increasing groove depth and wherein the relative movement of the tools with respect to one another takes place such that the end section of the decorative layer is introduced in the groove depth direction into the groove and
  pressing together the groove side walls for fixing the end section of the decorative layer in the groove.

In other words, in a method according to the invention, a connecting section is processed which has two different regions. The first region is deformable here under particular process conditions, whereas, in return, the second region is not deformable under these very conditions. Such process conditions can be defined by parameters such as pressure, temperature, relative humidity or other process parameters. With the use of a preform of plastic materials, for example a thermoplastic material, in particular the processing temperature is to be used as the control parameter for the process conditions of the deformability. On increasing the temperature, process conditions occur at which the first region remains non-deformable and the second region becomes deformable. This can be achieved for example by different materials with different elasticity deformation points/temperatures or by different material thicknesses of the individual regions.

After the insertion of the section therefore the decorative layer can be set locally on the first section of the preform by the moving together of the tools. A welding or gluing is not obligatorily necessary for this local setting. By moving together the first tool, rather, a definition of the site of the decorative layer is also possible without any additional fixing aids.

In a further step, the second section of the preform is placed onto a second tool, which is to be moved independently of the first tool. The first tool and the second tool are moved relative to one another in the groove depth direction. It is to be pointed out here that the term "groove depth direction" defines a direction according to a moving coordinate system. This coordinate system is established on the support part, in particular the preform, and has in the three dimensions the three directions of width direction, longitudinal direction and groove depth direction. The width and longitudinal directions substantially span the plane here in which the main surfaces of the preform extend. In particular, the edges between the two sections of the preform and the connecting section run here in longitudinal direction. The width direction is accordingly aligned perpendicularly to the longitudinal direction. The groove depth direction stands perpendicularly on both the longitudinal direction and also on the width direction of the preform and extends in the region of the connecting section in the direction of the base of the groove.

Relative movement of the first tool and of the second tool with respect to one another can be understood to mean both a movement of both tools and also only respectively of one of the two tools. Thus, one tool can be designed structurally so as to be fixed, whilst only the other tool is designed for movement. Through this relative movement of the two tools with respect to one another, the decorative layer is introduced into the groove in the groove depth direction. By this introduction into the groove, the fixing of the decorative layer on the preform is provided. In the last step of the method according to the invention, the groove side walls of the connecting section are pressed together and the decorative layer is thereby clamped or respectively fixed in the groove. By the introducing of the decorative layer in a defined position, namely defined by the first tool, an adhesive can be dispensed with and the local setting of the end section of the decorative layer in the groove can take place without further fixing means. The fixing of the decorative layer on the preform then takes place exclusively by the clamping in the groove.

In a method according to the invention, it can be in addition advantageous if by the pressing together of the groove side walls a jointless transition is formed between the decorative layer and the second section of the preform. Under the term "jointless transition" here in particular the production of a so-called zero gap is to be regarded as advantageous. This means that between the region with the decorative layer and the region without a decorative layer, i.e. between the decorative layer and the second section of the preform, as small a gap as possible, in particular no gap, is produced. No gap is to be understood here in the technical sense, so that in the actually present gap no fingers and also no dust or other contamination can penetrate. The production of such a jointless transition has the result that this region of the decorative layer can not be negatively affected by the fingers of the user of a motor vehicle. Moreover, no dirt or dust can penetrate into a gap which is not present, whereby the visual appearance of a support part produced according to the invention is further improved.

In addition it can be advantageous if in a method according to the invention, before the step of pressing together of the groove side walls, the end section of the decorative layer lies against both groove side walls of the groove. This is possible for example in that the first tool does not also move into the groove of the connecting section. Rather, in such a configuration, the first tool is able to guide the end section of the decorative layer into the groove, but does not itself also move into this groove. In this way, already before the pressing together of the groove side walls, the site of the decorative layer is exactly defined both on the first section and also in the connecting section of the preform. This exact definition is necessary in order to obtain an exact final positioning of the decorative layer on the preform after the pressing together. Through this possibility for exact positioning according to a method in accordance with the invention, it is possible to dispense entirely with adhesives or other fixing aids such as, for example, welding materials such as thermoplastic plastics.

It can likewise be advantageous if the decorative layer is fastened on the preform exclusively by means of clamping between the groove side walls. This clamping can be achieved in particular in that a deformation of the groove side walls takes place together with a deformation of the decorative layer. In this way, a material connection is produced between the decorative layer and the groove side walls of the connecting section. Such a material connection can be further improved if the region of the connecting section is brought under the influence of heat and the decorative layer and/or the groove side walls of the connecting section are produced from thermoplastic materials. In such a case, in addition to a pure pressing together and pressing which is generated thereby, an increased material connection can be produced by partial fusion.

In methods with materials which would develop negatively by thermal influence, such a thermal method can be dispensed with, because through the material connection but also through, for example, roughening of the surfaces of the groove side walls, an increased friction between the groove side walls and the decorative layer can be produced within the connecting section. This increased friction enables a pure clamping, so that the position of the decorative layer on the preform is defined exactly without making a thermal treatment or a gluing necessary. In this way, sensitive materials can also be processed by the method according to the invention and in addition an improved visual appearance can be produced at the joint between the decorative layer and the section without a decorative layer.

In a method according to the invention, it can be advantageous if the movement of the first tool and of the second tool relative to one another in the groove depth direction is a parallel displacement of the two sections of the preform relative to one another. Under the term "parallel displacement", in addition to a straight displacement, an angled parallel displacement is also conceivable here. An angled parallel displacement can be expedient inter alia when the step of pressing together is to be completed jointly with the step of the relative movement of the two tools with respect to one another. In this way, the first tool can move the first section together with the decorative layer in an angled manner to the second tool and hence also in an angled manner to the second section of the preform. In this way, the groove of the connecting section during this procedure is not only altered in its depth but also reduced in its width. In other words, through such an angled moving together by means of parallel displacement the introduction of the decorative layer into the groove takes place simultaneously with the pressing together of the groove side walls for fixing the decorative layer therein.

In addition it can be advantageous if in a method according to the invention the movement of the first tool and of the second tool relative to one another in the groove depth direction is a movement, combined from parallel displacement and rotation, of the two sections of the preforms relative to one another. Such a rotation is expedient in particular in the use of relatively thick decorative layers. In this way, the two procedures of introducing the decorative layer into the groove and of fixing the decorative layer in the groove are separated from one another. The introduction can therefore take place with a relatively wide groove, whereas subsequently by rotation of the first tool or else by a further parallel displacement in this case in the width direction of the preform, a pressing together of the groove side walls takes place. Thereby in this second step the decorative layer is fixed in the groove and is thereby exactly defined locally to the preform.

As already explained above, it can be expedient if the movement of the first and second tools relative to one another in the groove depth direction simultaneously also presses the groove side walls together. Such a combined method is advantageous in particular with regard to saving time, because in a shorter time, through the carrying out of two movements and hence of two process steps simultaneously, the desired support part can be manufactured more quickly.

In addition it can be advantageous if in a method according to the invention at least a portion of one of the two tools is able to be heated, in order to heat the section of the preform lying against this part and/or the decorative layer lying against this part. In this way, in addition to the pure form fit, for example by clamping, or fixing by friction in the groove, an additional material connection is possible. For example, with the use of thermoplastic materials for the preform and/or for the decorative layer, through the thermal influence a portion of these regions can be fused and through the pressing together and subsequent cooling they can be connected with one another in a form-fitting manner. In other words, at this point together with the pressing together of the two groove side walls, in addition a fusing step of the decorative layer with the preform can be carried out.

In addition it can be advantageous if the movement of the first and of the second tools relative to one another in the groove depth direction is carried out so such an extent that subsequently the visible upper side of the decorative layer lies flush with that of the visible upper side of the second section of the preform. The result of a method according to the invention therefore has a flush transition of the support part between the section with a decorative layer and the section without a decorative layer. For the user of a motor vehicle in which a support part according to the invention is installed as a side panel, an improved visual appearance is therefore produced. Moreover, on moving his fingers over this joint, he can feel as a haptic sensation on the one hand the decorative layer, on the other hand the support layer, without between these two sections a step, a gap, or being given a similar indication of these two different sections. The quality of the surface feel and also the quality of the visual appearance are therefore distinctly increased by a method according to the invention.

It can also be advantageous if in a method according to the invention the angle formed between the first section of the preform and the first region of the connecting section before the start of the method is less than or equal to 90°. In this way, in fact no open V-shaped groove is formed, from which the decorative layer could slip out again after introduction into the groove. Rather, a groove is formed with parallel side walls or even undercuts of the groove side walls, so that the decorative layer within the groove, after the relative movement of the two tools with respect to one another, i.e. after the introduction of the decorative layer into the groove, remains in the latter. The subsequent and partially separately performed step of the guiding together of the two groove side walls by the tools can therefore also be carried out with a time gap from the first step of the introducing, without the risk that the decorative layer slips out from the groove again.

In addition, a device for carrying out a method according to the invention is a subject of the present invention.

Also, a product produced by a method according to the invention is a subject of the present invention.

In addition a preform for use in a method according to the present invention is a subject of the present invention. The preform has here a first section, which is to be laminated with the decorative layer, and a second section adjoining thereto in the contour path of the preform. The first section runs along a groove depth direction of a groove formed by a connecting section, and a first region of the connecting section adjoins the first section of the preform. A second region of the connecting section is situated between the first region of the connecting section and the second section of the preform and is deformable under predetermined process conditions.

BRIEF DESCRIPTION OF THE DRAWINGS

The present invention is explained in further detail with the aid of the figures of the drawings. The terms "left", "right", "above", "below" refer here to the figures in an alignment with normally readable reference numbers. There are shown here.

DETAILED DESCRIPTION OF THE ILLUSTRATED EMBODIMENT(S)

Figure 1:
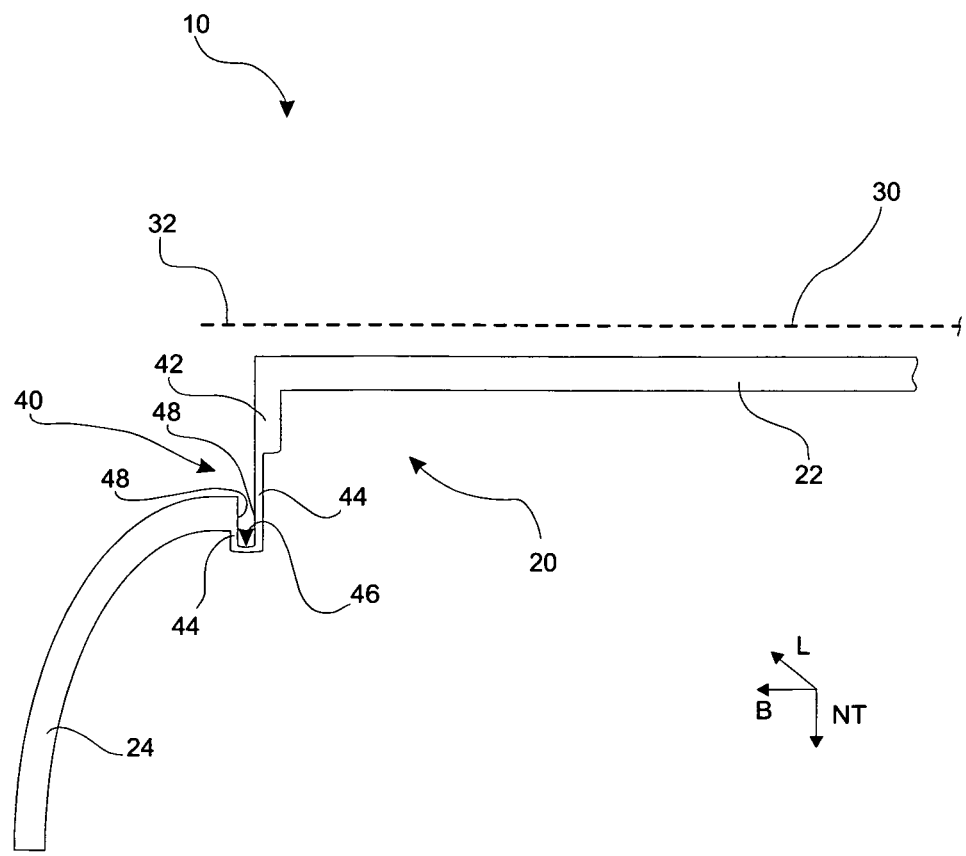
FIG. 1 an embodiment for a preform for executing an embodiment of the method.

In FIG. 1 a starting point is illustrated for a method according to the invention. A preform 20 has substantially three sections here. A first section 22 of the preform 20 is to be covered by a decorative layer 30. This decorative layer 30 is illustrated as a dashed line already above the first section 22. Adjacent to the first section 22, the preform 20 has a connecting section 40. This connecting section 40 constitutes the connection between the first section 22 and a second section 24 of the preform 20. In this embodiment, the second section 24 is provided with a rounded profile, whereas the first section 20 has substantially a straight, flat extent.

The preform 20 and the decorative layer 30 together form the support part 10, which in a process step following the method according to the invention can be used for example in the lining of a motor vehicle.

The connecting section 40 of the preform 20 is formed from a first region 42, which adjoins the first section 22 of the preform 20, and from a second region 44, which adjoins the second section 24 of the preform 20. The second region 44 is provided with a groove 46, which defines a depth direction NT and a groove longitudinal direction L. This groove 46 is formed by two partial regions of the second region 44 of the connecting section 40, namely a first partial region, the flat extent of which extends along the groove depth direction NT and which forms a first inner surface of the groove, and a second partial region, which extends along and substantially at least in parts parallel to the first partial region and forms a second inner surface of the groove, which lies opposite the first inner surface. The groove 46 is formed within the second region 44. In the embodiment according to FIG. 1, the first region 42 is relatively thick when viewed in the longitudinal direction L. i.e. is embodied with a relative great material thickness with respect to the second region 44, preferably embodied with the same thickness as the first section 22 of the preform 20 and/or preferably 30% thicker than the second region 44. In comparison, the second region 44 of the connecting section 40 is embodied so as to be relatively thin and is accordingly plastically deformable more easily. In the embodiment according to FIG. 1, the groove 46 is delimited exclusively by the groove side walls which lie opposite one another, which are both given the reference number 48 and one of which in this situation is formed by the deformable second region 44. In this initial situation, which is illustrated in FIG. 1, the preform 20 is inserted into a first tool W1 and the decorative layer 30 is placed on the first section 22 of the preform 20. After the inserting into the first tool W1, the second section 24 is placed on a second tool W2. Following this, a second element of the first tool W1 is placed on the upper side of the first section 22 and the decorative layer 30. The end of these steps is illustrated in FIG. 2.

Figure 2:
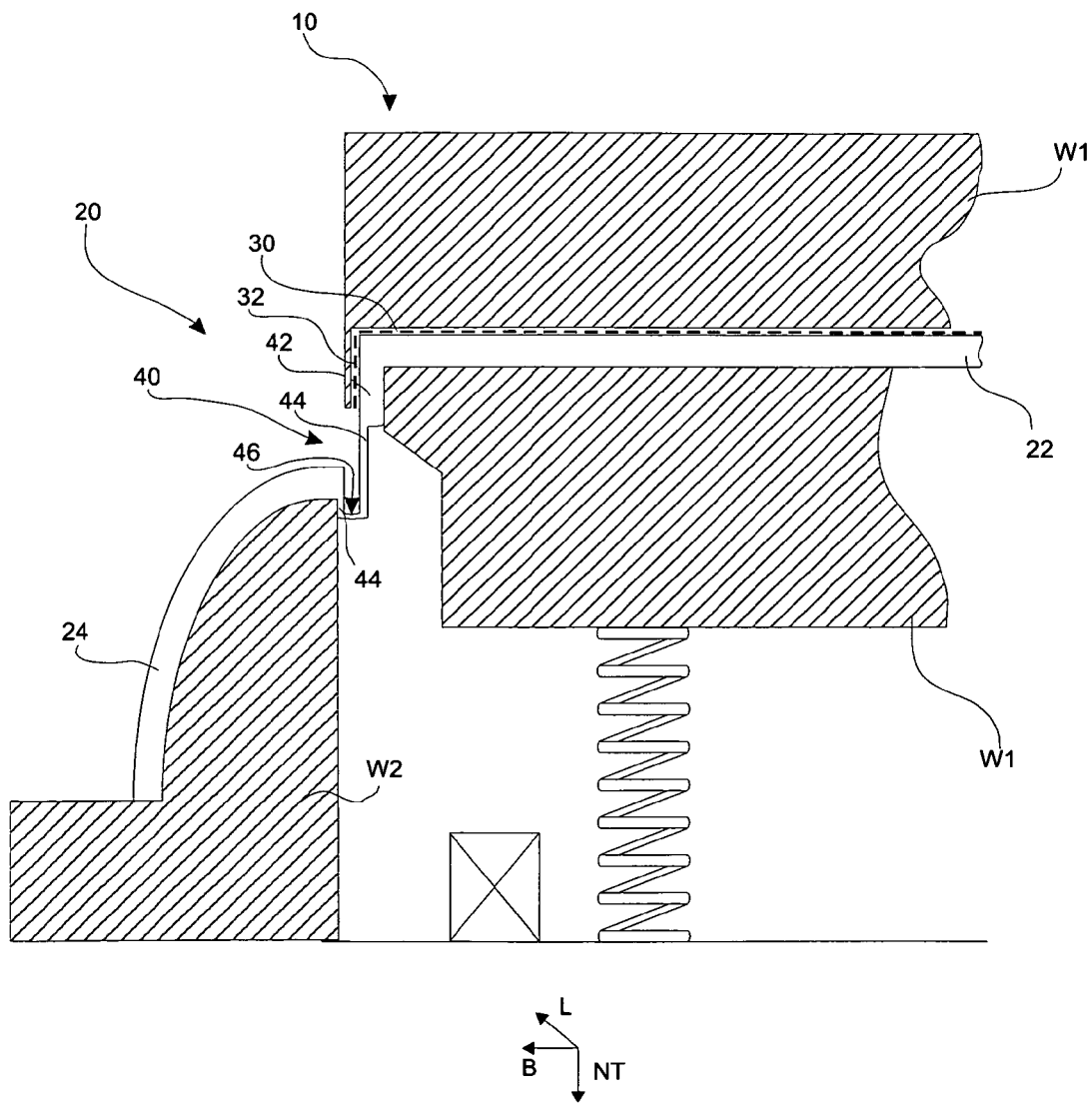
FIG. 2 situation of the method according to the invention after the guiding together of the first tool and the placing on the second tool according to an embodiment, FIG. 3 situation during the relative movement of the two tools with respect to one another according to an embodiment, FIG. 4 situation after the relative movement of the two tools with respect to one another according to an embodiment, FIG. 5 situation after removal of a portion of the first tool and during the guiding together of the groove side walls according to an embodiment, FIG. 6 product produced by a method according to the invention according to an embodiment.

It can be seen from FIG. 2 that a two-part first tool W1 encloses the first section 22 and the decorative layer 30 together. Moreover, the first tool W1 has an end section, which bends the end section 32 of the decorative layer 30 around and lays it against the connecting section 40. The laying-on of the end section 32 of the decorative layer 30 takes place here in the first region 42 of the connecting section 40.

The first tool W1 serves therefore in a first step for fixing the decorative layer 30 on the first section 22 of the preform 20. The second tool W2 serves in this situation for the supporting of the preform 20, in particular of the second section 24 of the preform 20. A relative movement is then carried out, which takes place between the first tool W1 and the second tool W2. According to the embodiment in the present figures, the relative movement takes place in such a way that the first tool W1 is moved with respect to the second tool W2. The second tool W2 is therefore stationary during the relative movement. A situation during this movement procedure is illustrated in FIG. 3.

Figure 3:
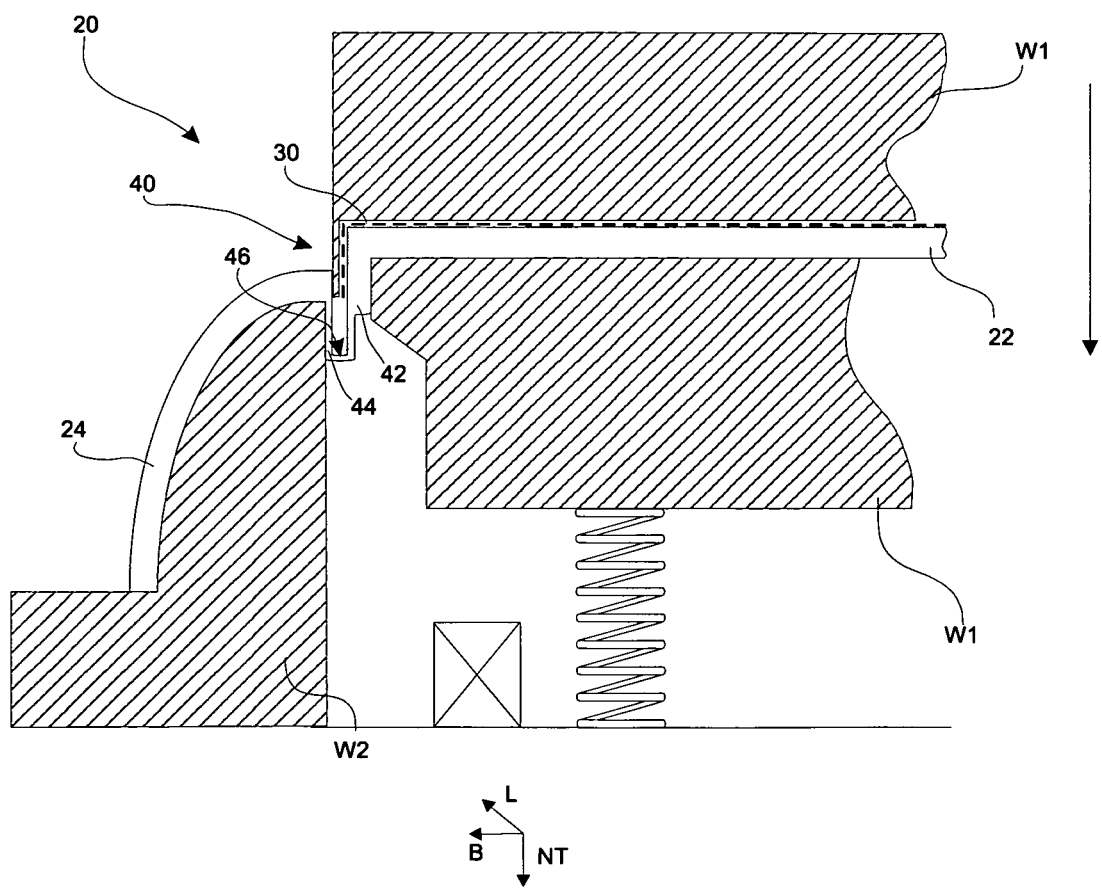

As can be seen from FIG. 3, the first tool W1 moves in the groove depth direction NT relative with respect to the second tool W2. The second tool W2 therefore forms a kind of abutment for the deformation of the preform 20. The deformation of the preform 20, which takes place from the relative movement of the two tools W1 and W2 with respect to one another, is carried out exclusively in the second region 44 of the connecting section 40. The second region 44 therefore forms a target deformation region under the defined process conditions of the step according to FIG. 3, whereas the remaining regions of the preform 20, in particular the first region 42 of the connecting section 40, remain undeformed.

The movement of the first tool W1 takes place here against a spiral spring, which after completion of the method according to the invention can move the tool W1 into its initial position again.

Figure 4:
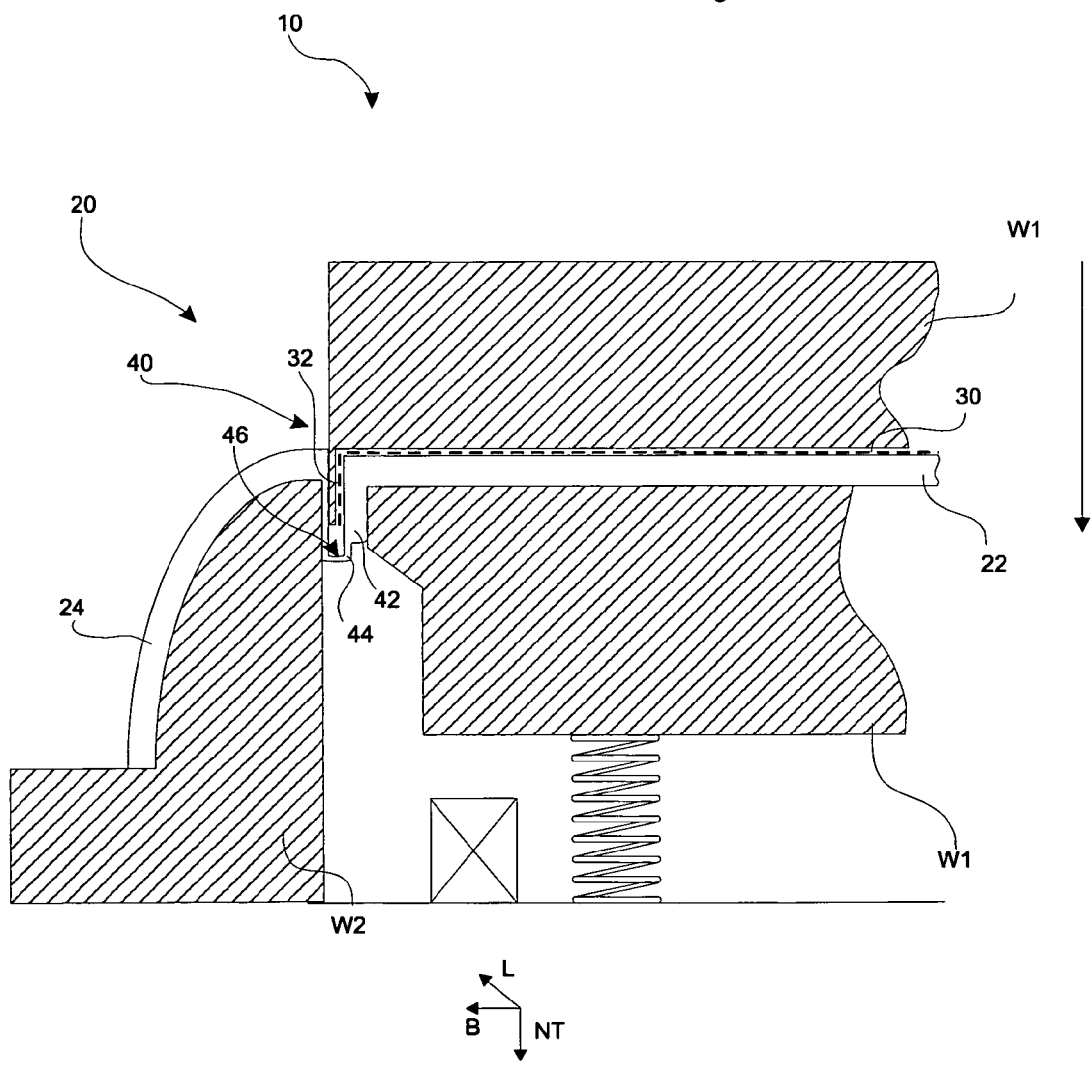

The end of the relative movement procedure between the two tools W1 and W2 is illustrated in FIG. 4. It can be seen there that through the relative movement of the first tool W1 to the second tool W2, the end section 32 of the decorative layer 30 has been introduced into the groove 46. In this situation, the groove 46 is now no longer exclusively formed by the groove side walls 48 from the deformable second region 44, but rather for the most part the non-deformable first region 42 of the connecting section 40 forms a groove side wall. In this situation, the decorative layer 30 is already situated in its final position with respect to the groove depth direction.

Following the situation which is illustrated in FIG. 4, the first part of the tool W1 is removed, so that the end section of the tool Wl, which together with the end section 32 of the decorative layer 30 projects into the groove 46 is withdrawn from this groove 46. In this way, the possibility exists to subsequently guide the two groove side walls 48 together, in order to clamp the end section 32 of the decorative layer 30 between the groove side walls 48. The movement of the guiding together takes place here in the width direction of the preform 20. The movement can take place here for example by a relative movement of the tools W1 and W2 with respect to one another. For a particularly simple structural embodiment, the tool W1 is provided here exclusively for a movement in the groove depth direction, whereas the second tool W2 is provided exclusively for a movement in the width direction of the preform 20. Alternatively, however, the second tool W2 can also be designed to be purely static, whereas the first tool W1 can carry out movements in the groove depth direction and also in the width direction.

Figure 5:
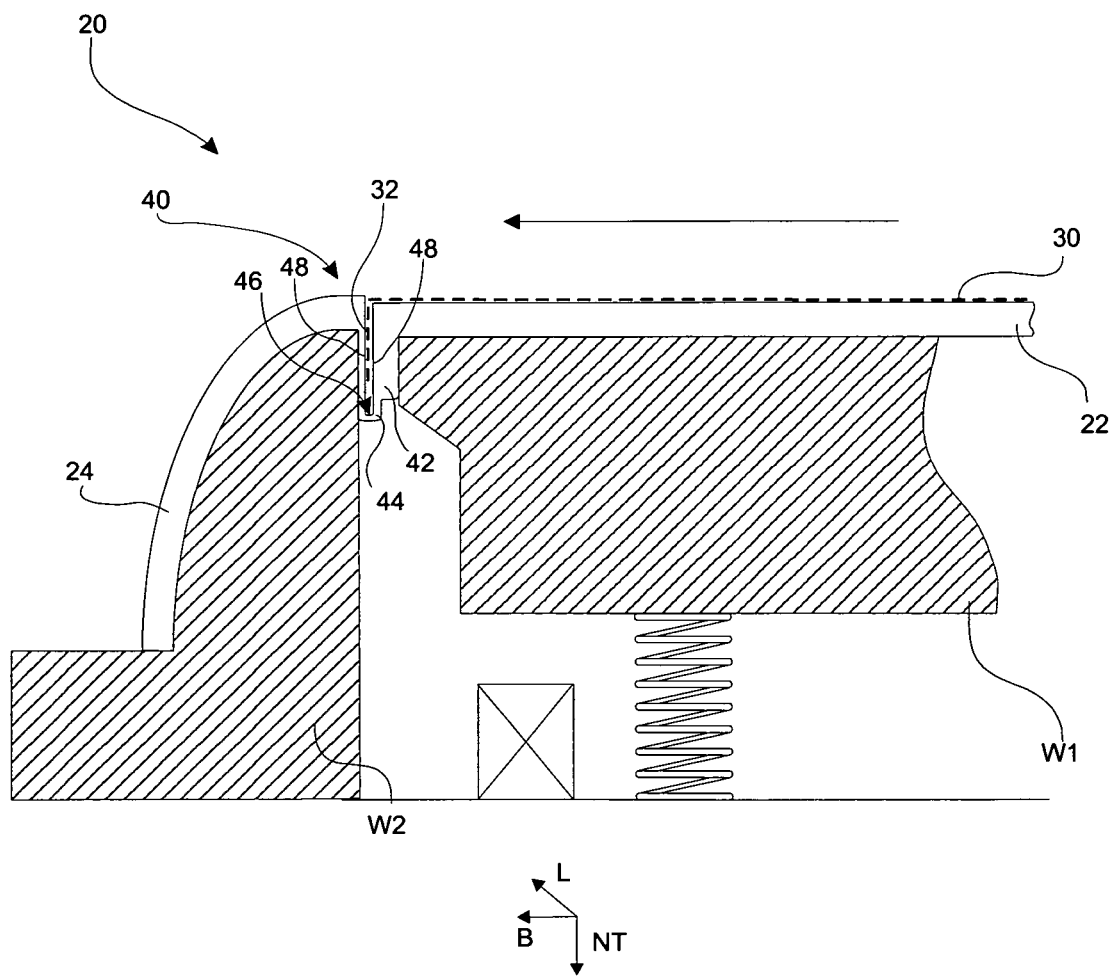

FIG. 5 shows the completion of the guiding together of the two groove side walls 48 and hence the result of the fixing of the end section 32 of the decorative layer 30 on the preform 20.

After removal of the tools W1 and W2, a support part 10 remains, which has been provided with a decorative layer 30 on a first section 22 of a preform. This situation is illustrated in FIG. 6. Between the decorative layer 30 and the second section 24 of the preform 20, which is not provided with a decorative layer, a minimal gap or respectively no remaining gap is present, i.e. a so-called zero gap. In addition, the surface of the decorative layer 30 has been configured flush with the surface of the second section 24. In this way, in addition to a seamless transition between the second section 24 and the decorative layer 30, the possibility for accumulations of dirt and dust in a groove which is no longer present, namely the zero gap, between the decorative layer 30 and the second section 24 is improved.

The invention claimed is:

1. A method for applying and fastening a decorative layer on a preform for the formation of a support part, wherein the preform comprises:
    a first section which is to be laminated with the decorative layer;
    a second section; and
    a connecting section connecting the first section and the second section along a groove extending in a longitudinal direction and in a groove depth direction, wherein the connecting section comprises a first region adjoined to the first section of the preform and a second region adjoined to the second section of the preform, and
wherein the method comprises the steps of:
    connecting the first section of the preform to the decorative layer by closing a first tool,
    wherein an end section of the first tool bends and disposes an end section of the decorative layer against at least a portion of the first region of the connecting section,
    moving the first and a second tool, onto which the second section of the preform is placed, relative to one another in the groove depth direction, whereby the second region of the connecting section is deformed and the end section of the decorative layer is introduced in the groove depth direction into the groove, and
    moving the first and the second tool relative to each other across the groove depth direction and thereby pressing together side walls of the groove to fix the end section of the decorative layer in the groove.

2. The method according to claim 1, characterized in that by the pressing together of the groove side walls a jointless transition is formed between the decorative layer and the second section of the preform.

3. The method according to claim 1, characterized in that before pressing together the groove side walls, the end section of the decorative layer lies against both groove side walls of the groove.

4. The method according to claim 1, characterized in that the decorative layer is fastened on the preform exclusively by means of clamping between the groove side walls.

5. The method according to claim 1, characterized in that the movement of the first tool and of the second tool relative to one another in the groove depth direction is a pure parallel displacement of the two sections of the preform relative to one another.

6. The method according to claim 1, characterized in that the movement of the first tool and of the second tool relative to one another in the groove depth direction is a movement, combined from parallel displacement and rotation, of the two sections of the preform relative to one another.

7. The method according to claim 1, characterized in that the movement of the first tool and of the second tool relative to one another in the groove depth direction simultaneously also presses the groove side walls together.

8. The method according to claim 1, characterized in that at least a portion of one of the tools is able to be heated, in order to heat the preform and/or the decorative layer.

9. The method according to claim 1, characterized in that the movement of the first tool and of the second tool relative to one another in the groove depth direction is configured to be of such an extent that subsequently the decorative layer lies flush with the second section of the preform.

10. The method according to claim 1, characterized in that the angle formed between the first section of the preform and the first region of the connecting section is less than or equal to 90° before the step of connecting.

11. The method according to claim 1, wherein the decorative layer is laminated with the first section on a first side of the preform, and the groove is opened to the first side of the preform.

12. The method according to claim 11, wherein the second region of the connecting section is formed as a curved section when viewed along the groove longitudinal direction, the curved section forming the groove.

13. The method according to claim 1, wherein the connecting section is plastically deformed during the step of moving the first and second tools relative to one another in the groove depth direction.

14. The method according to claim 13, wherein the distance between the first section and the second section of the preform in the groove depth direction is reduced during the step of moving the first and second tools relative to one another in the groove depth direction.

* * * * *